United States Patent
Cheng

(10) Patent No.: US 7,513,922 B2
(45) Date of Patent: Apr. 7, 2009

(54) AIR FILTER FOR ELECTRIC WELDING

(76) Inventor: Yuan-Tai Cheng, No. 169, Chung Shan Road, Feng Yuan, Taichung (TW) 420

( * ) Notice: Subject to any disclaimer, the term of this patent is extended or adjusted under 35 U.S.C. 154(b) by 344 days.

(21) Appl. No.: 11/391,398

(22) Filed: Mar. 29, 2006

(65) Prior Publication Data

US 2007/0234688 A1   Oct. 11, 2007

(51) Int. Cl.
B01D 46/00 (2006.01)
B01D 46/40 (2006.01)

(52) U.S. Cl. .................. 55/385.1; 55/302; 55/320; 55/337; 55/356; 55/429; 55/472; 55/476; 55/351; 55/352; 55/353; 55/354; 222/152; 222/146.5; 239/130; 454/63; 454/65

(58) Field of Classification Search .......... 55/302, 55/320, 337, 356, 429, 472, 385.1, 476, 351–354; 222/152, 146.5; 239/130; 454/63, 65
See application file for complete search history.

(56) References Cited

U.S. PATENT DOCUMENTS

| 2,772,625 | A | * | 12/1956 | Clark, Jr. | 454/63 |
| 3,898,414 | A | * | 8/1975 | Hawley | 219/72 |
| 4,158,462 | A | * | 6/1979 | Coral | 285/144.1 |
| 4,163,650 | A | * | 8/1979 | Watson et al. | 96/57 |
| 4,512,245 | A | * | 4/1985 | Goldman | 96/142 |
| 4,617,033 | A | * | 10/1986 | Strang | 96/1 |
| 4,718,924 | A | * | 1/1988 | DeMarco | 55/302 |
| 4,802,983 | A | * | 2/1989 | Howeth | 55/302 |
| 4,860,644 | A | * | 8/1989 | Kohl et al. | 454/65 |
| 4,868,948 | A | * | 9/1989 | Arnold | 15/340.1 |
| 4,957,520 | A | * | 9/1990 | Parmentier et al. | 96/136 |
| 5,036,754 | A | * | 8/1991 | Simms et al. | 454/65 |
| 5,097,750 | A | * | 3/1992 | Oldham et al. | 454/63 |
| 5,147,427 | A | * | 9/1992 | Abbot et al. | 55/302 |
| 5,281,246 | A | * | 1/1994 | Ray et al. | 55/302 |
| 5,511,764 | A | * | 4/1996 | Wonsetler | 266/49 |
| 5,702,493 | A | * | 12/1997 | Everetts et al. | 55/356 |
| 5,951,725 | A | * | 9/1999 | Vross et al. | 55/356 |
| 6,395,047 | B1 | * | 5/2002 | Smith | 55/385.2 |
| 6,616,720 | B1 | * | 9/2003 | Smith | 55/385.2 |
| 6,679,416 | B2 | * | 1/2004 | Lin | 228/57 |
| 2003/0150327 | A1 | * | 8/2003 | Bolden | 95/273 |

* cited by examiner

*Primary Examiner*—Duane Smith
*Assistant Examiner*—Minh-Chau T Pham
(74) *Attorney, Agent, or Firm*—Ming Chow Sinorica, LLC

(57) ABSTRACT

An air filter for electric welding includes a box having an opening for connecting with a sucking tube, an dividing plate dividing the box into an upper chamber communicating with the opening and a lower chamber, a spark blocker inside the upper chamber, a movable filter device set under the spark blocker inside the upper chamber and provided with a cloth filter, a blower inside the lower chamber, and an extractable screening device installed outside it and communicating with the lower chamber. In using, when the blower is switched on, the air is sucked in from the sucking tube to the spark blocker, the movable filter device, the blower and the extractable screening device orderly, blocking sparks completely and achieving an effective filtration.

15 Claims, 7 Drawing Sheets

AIR FILTER FOR ELECTRIC WELDING

BACKGROUND OF THE INVENTION

1. Field of the Invention

This invention relates to an air filter for electric welding, particularly to one able to block sparks and carry out filtration considerably well.

2. Description of the Prior Art

Metallic welding is very common in factories involving zinc welding, electric welding and heat treatment. Volatile fume produced by welding may contain heavy metals, such as lead, cadmium, manganese, nickel and chromium, and these metals may cause professional diseases such as fume fever, zinc fever, brass fever, asthma (poisoned by nickel), Parkinson disease (poisoned by manganese) and lung cancer (poisoned by chromium oxide), posing potential danger to human health. In order to protect persons exposed in such a contaminated environment, ventilation or wearing a proper respirator has been conventionally done so far. But, a lot of factories restricted by their structure cannot obtain good ventilation. Badly, a conventional ventilator with no additional screening function can merely expel the contaminated air elsewhere and make it dispersed in all direction, giving potential danger to people's life. Next, a respirator can only protect who wears it but not those who don't. Moreover, a worker wearing a respirator is prone to do only a lower quality job. Although, some factories use an industrial screen device while ventilating, but the screen is very easy to be clogged with oil and impurities produced during welding, having to replace with a new one very often, giving users much embarrassment indeed. Unfortunately, the screen used industrially does not have a function of extinguishing sparks that may cause a fire or an air explosion once it is sucked into the interior of the equipment.

SUMMARY OF THE INVENTION

The objective of this invention is to offer an air filter for electric welding.

The main characteristics of the invention are a box provided with an opening for connecting with a sucking tube, a dividing plate dividing the box into an upper chamber communicating with the opening and a lower chamber, a spark blocker inside the upper chamber, a movable filter device set under the spark blocker inside the upper chamber and provided with a cloth filter, a blower inside the lower chamber, and an extractable screening device installed outside it and communicating with the lower chamber. In using, when the blower is switched on, air to be filtrated is sucked in from the sucking tube to the spark blocker and then, the movable filter device, the blower and the extractable screening device orderly. The spark blocker can block sparks effectively to prevent a fire or an air explosion from happening, and be extracted out easily to dump the spark residues. The cloth filter can be rotated timely to maintain a considerable fresh condition for filtering off oil and impurities that may clog the extractable screening device. Therefore, a fluent suction can be achieved and the screening device doesn't have to be replaced or cleaned often.

BRIEF DESCRIPTION OF DRAWINGS

This invention is better understood by referring to the accompanying drawings, wherein.

DETAILED DESCRIPTION OF THE PREFERRED EMBODIMENT

Figure 1:
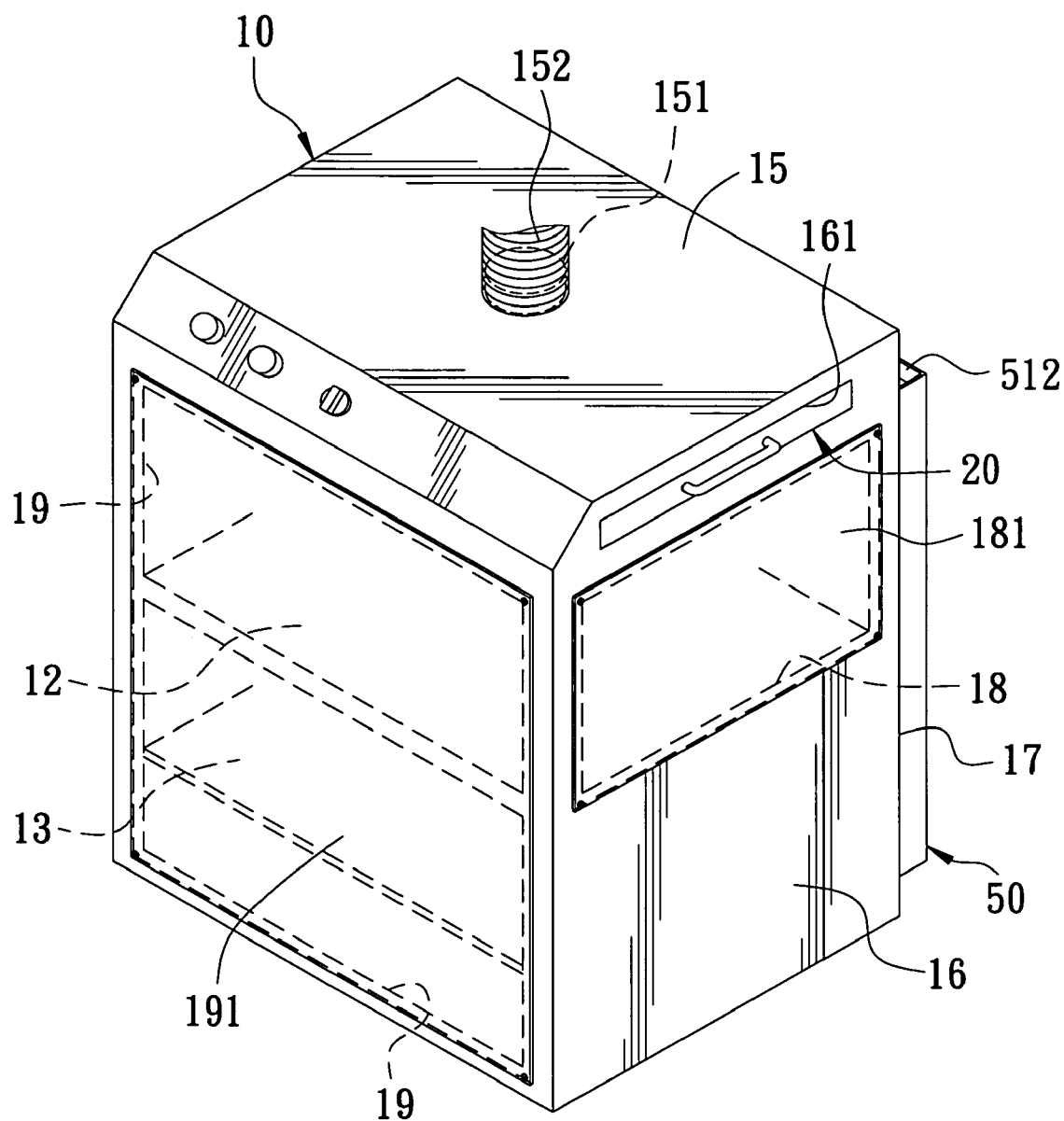
FIG. 1 is a perspective view of a preferred embodiment of an air filter for electric welding in the present invention.
Figure 2:
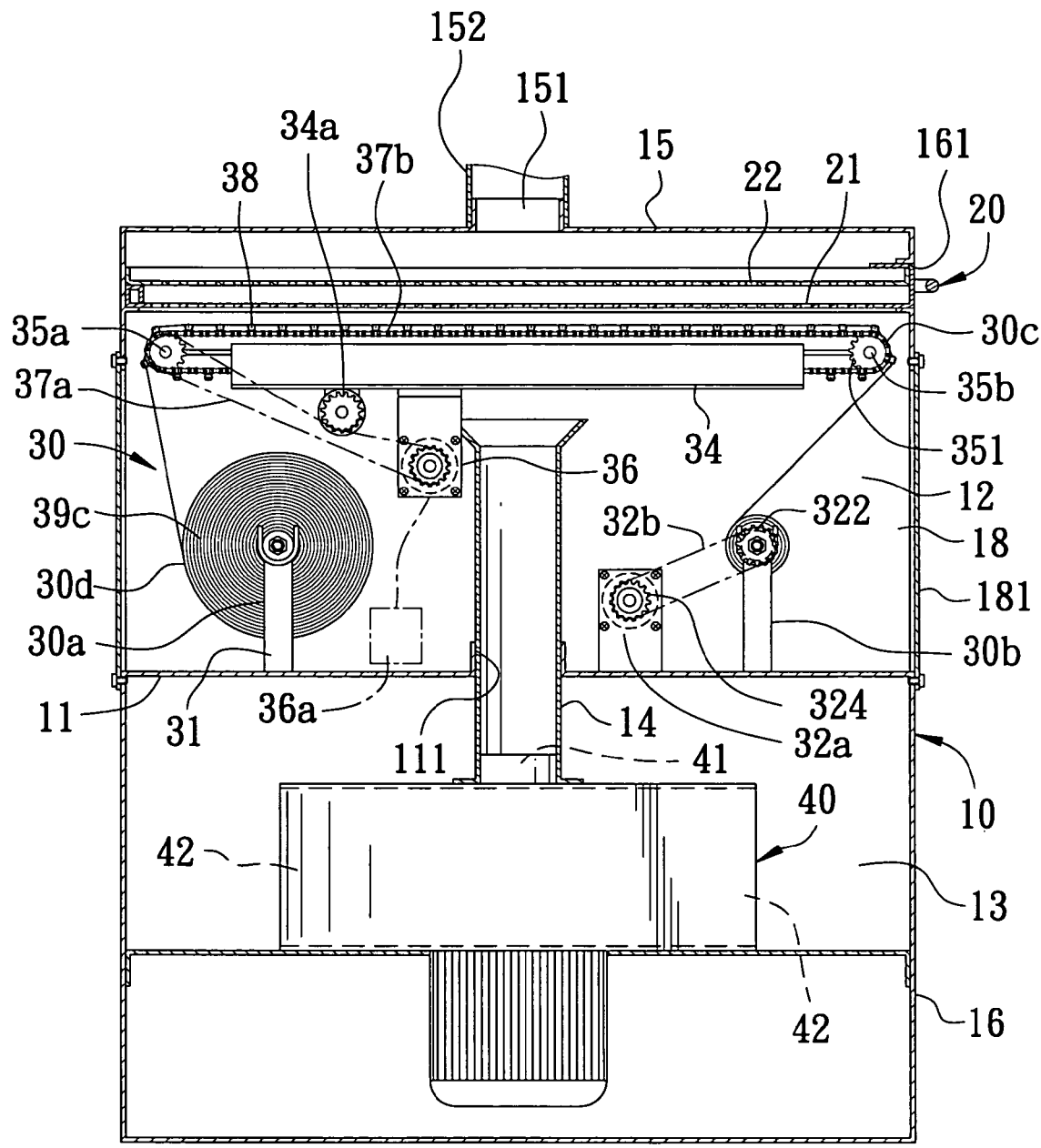
FIG. 2 is a front view of the preferred embodiment of an air filter for electric welding in the present invention.
Figure 3:
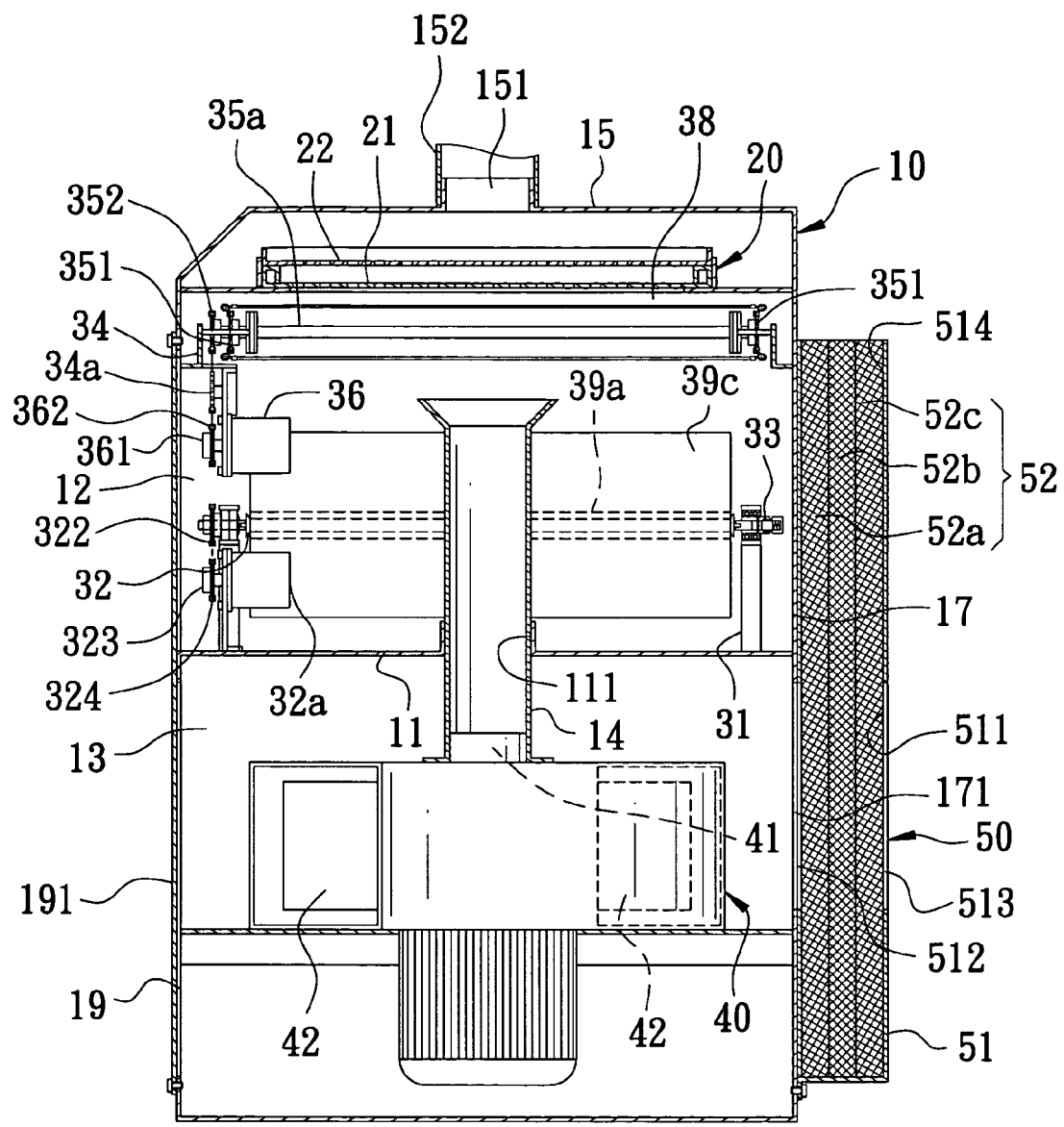
FIG. 3 is a side view of the preferred embodiment of an air filter for electric welding in the present invention.

As shown in FIGS. 1-3, a preferred embodiment of an air filter for electric welding in the present invention includes a box 10, a spark blocker 20, a movable filter device 30, a blower 40 and an extractable screening device 50 as main components The box 10 shaped rectangular is provided with a dividing plate 11 interiorly to divide it into an upper chamber 12 and a lower chamber 13. The dividing plate 10 is provided with a penetrating hole 111 at the center for fitting with a tube 14, which has two ends extending respectively into the upper chamber 12 and the lower chamber 13. The box 10 is further provided with a top wall 15 provided with an opening 151 at the center for connecting with a sucking tube 152 that is able to be adjustably bent to a required direction, a sidewall 16 provided with a plugging groove 161 at the top, a rear wall 17 provided with an opening 171 communicating with the lower chamber 13, an opening 18 formed respectively at two sides of the upper chamber 12 and covered pivotally by a movable side cover 181, and an opening 19 formed respectively at the front of the upper chamber 12 and the lower chamber 13 and covered pivotally by a movable front cover 191.

Figure 4:
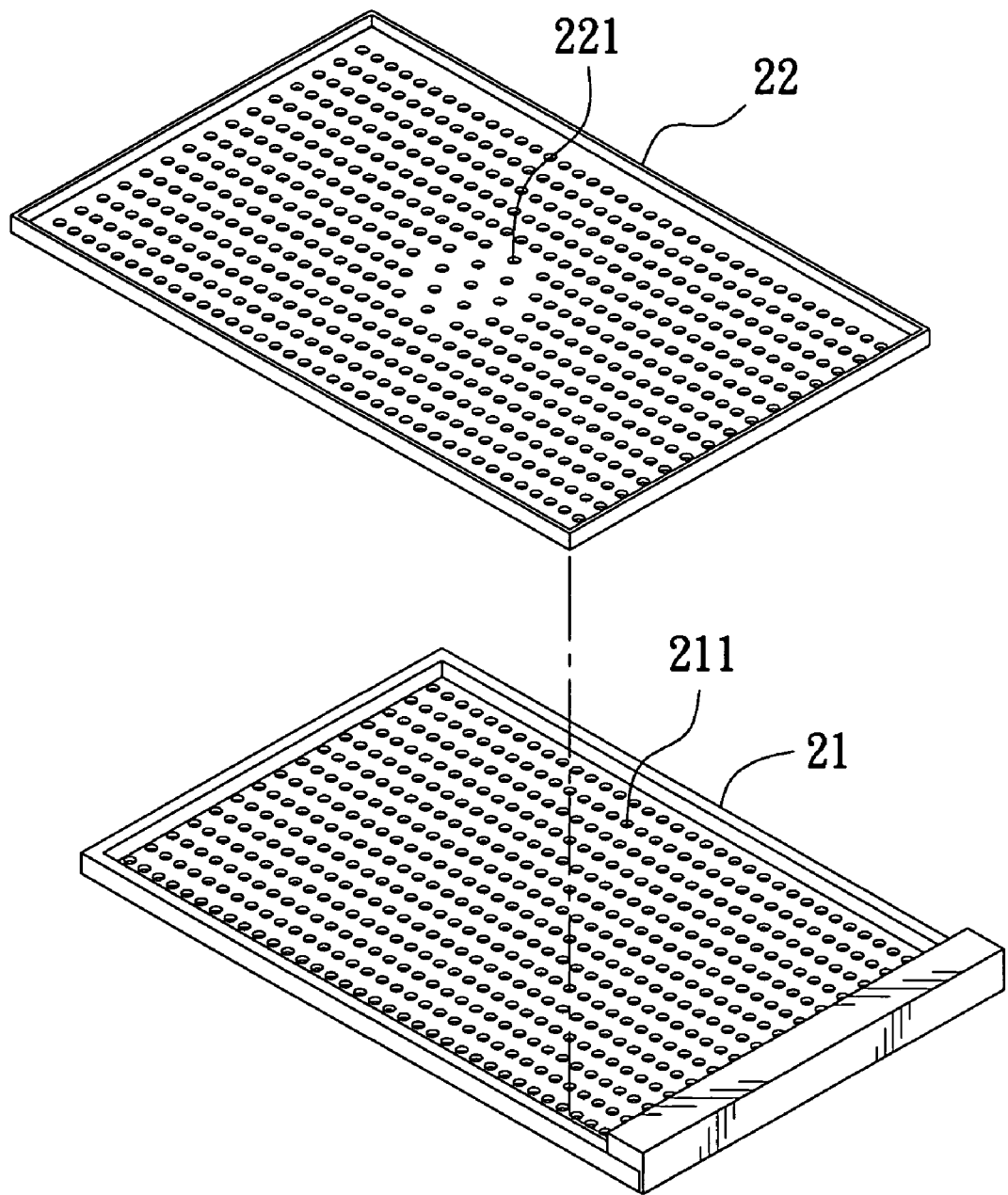
FIG. 4 is an exploded view of a spark blocker in the preferred embodiment of an air filter for electric welding in the present invention.

The spark blocker 20, as shown in FIG. 4, is composed of an upper plate 22 and a lower plate 21, made of metal. The upper plate 22 is placed above the lower plate 21 and spaced apart properly. Both the upper plate 22 and lower plate 21 are respectively provided with plural air vents 221 and 211 of a proper size. The air vents 221 bored in the central portion of the upper plate 22 are more thinly located than those in the rest portion. In addition, the spark blocker 20 can be plugged into the plugging groove 161 to just seal the top of the upper chamber 12, enabling the air vents 221 of the upper plate 22 to locate approximately under the opening 151 of the top wall 15 so that air may be sucked in to pass evenly through the whole upper plate 22 instead of the portion limited just right under the opening 151. Moreover, because the upper plate 22 and lower plate 21 are to block sparks from passing into the box 10, they can properly collect spark residue that can be dumped by extracting out the spark blocker 20.

The movable filter device 30 installed inside the upper chamber 12 is provided with a first rolling base 30a, a second rolling base 30b corresponding with the first rolling base 30a, a rolling table 30c and a rolled cloth filter 30d.

The first rolling base 30a is provided with two bases 31 that respectively have a support post 311 with its lower end respectively fixed at a front and a rear portion of the left upper surface of the dividing plate 11, a bearing base 312 at the top and two bearings 313 installed inside the bearing base 312, an immovable pivot 32 connected pivotally with the two bearings 313 of one of the bases 31 and provided with an immovable stopper 321 at an inner end, and a movable pivot 33 connected pivotally with two bearings 313 of the other base 31 and provided with a stopper 331 at an inner end able to be moved inwards together with the pivot 33.

Figure 5:
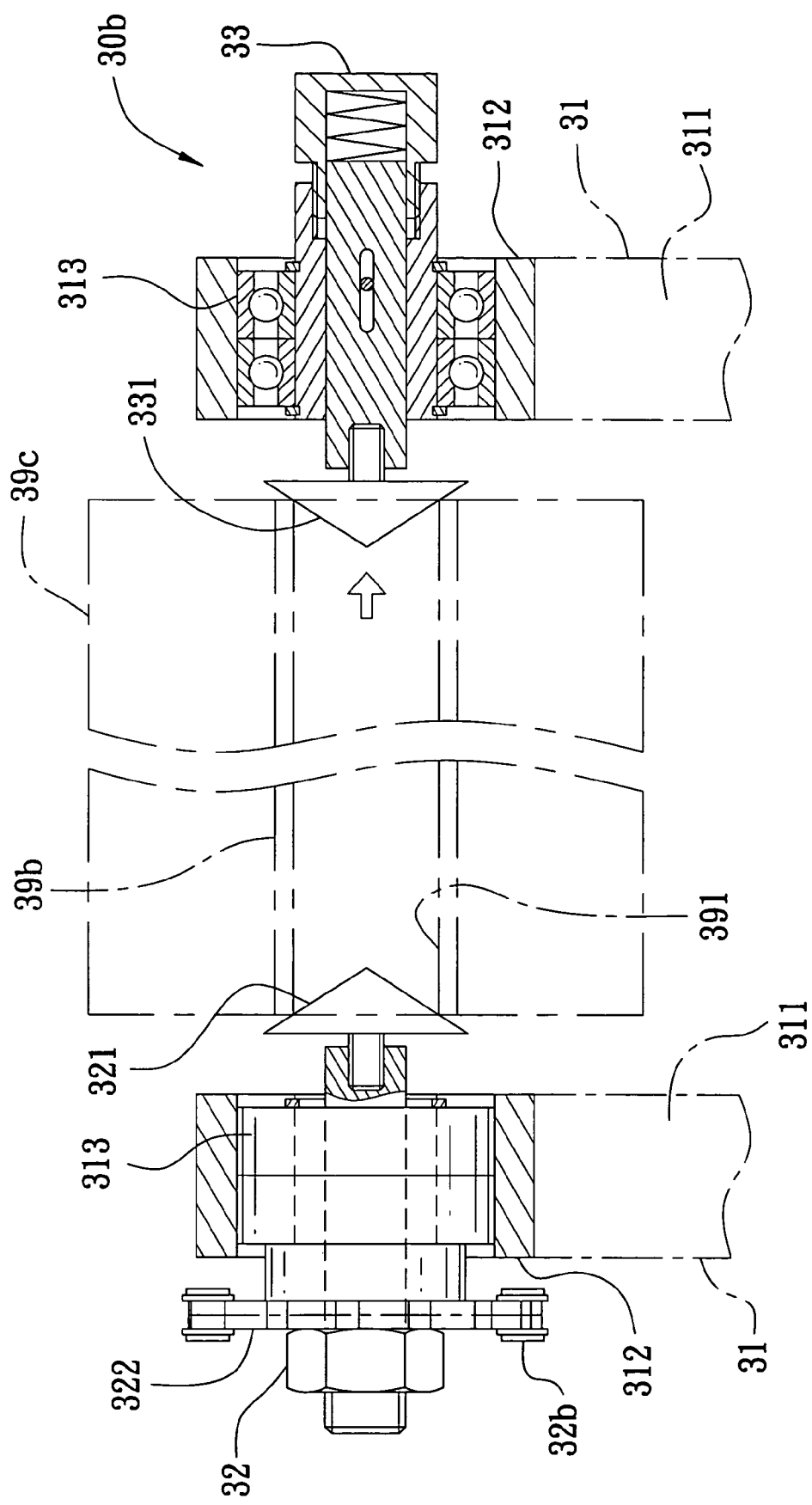
FIG. 5 is a partial perspective view of a rotating table in the preferred embodiment of an air filter for electric welding in the present invention.

The second rolling base 30b is also provided with two bases 31 that respectively have a support post 311 having a lower end 311 respectively fixed at a front and a rear portion of the right upper surface of the dividing plate 11, a bearing base 312 at the top and two bearings 313 installed inside the bearing base 312, an immovable pivot 32, as shown in FIG. 5, connected pivotally with two bearings 313 of one of the bases 31 and provided with an immovable stopper 321 at an inner end, a driven gear 322 connected pivotally with the immovable pivot 32, and a movable pivot 33 fixed pivotally with two bearings 313 of the other base 31 and provided with a stopper 331 movable inwards, a driving motor 32a installed on the upper surface of the dividing plate 11 and provided with a power-output shaft 323, a driving gear 324 fixed on the shaft 323, and a chain 32b mounted between the driven gear 322 of the immovable pivot 32 and the driving gear 324 of the driving motor 32a, able to transfer the power of the driving motor 32a to drive the immovable pivot 32 to rotate.

Figure 6:
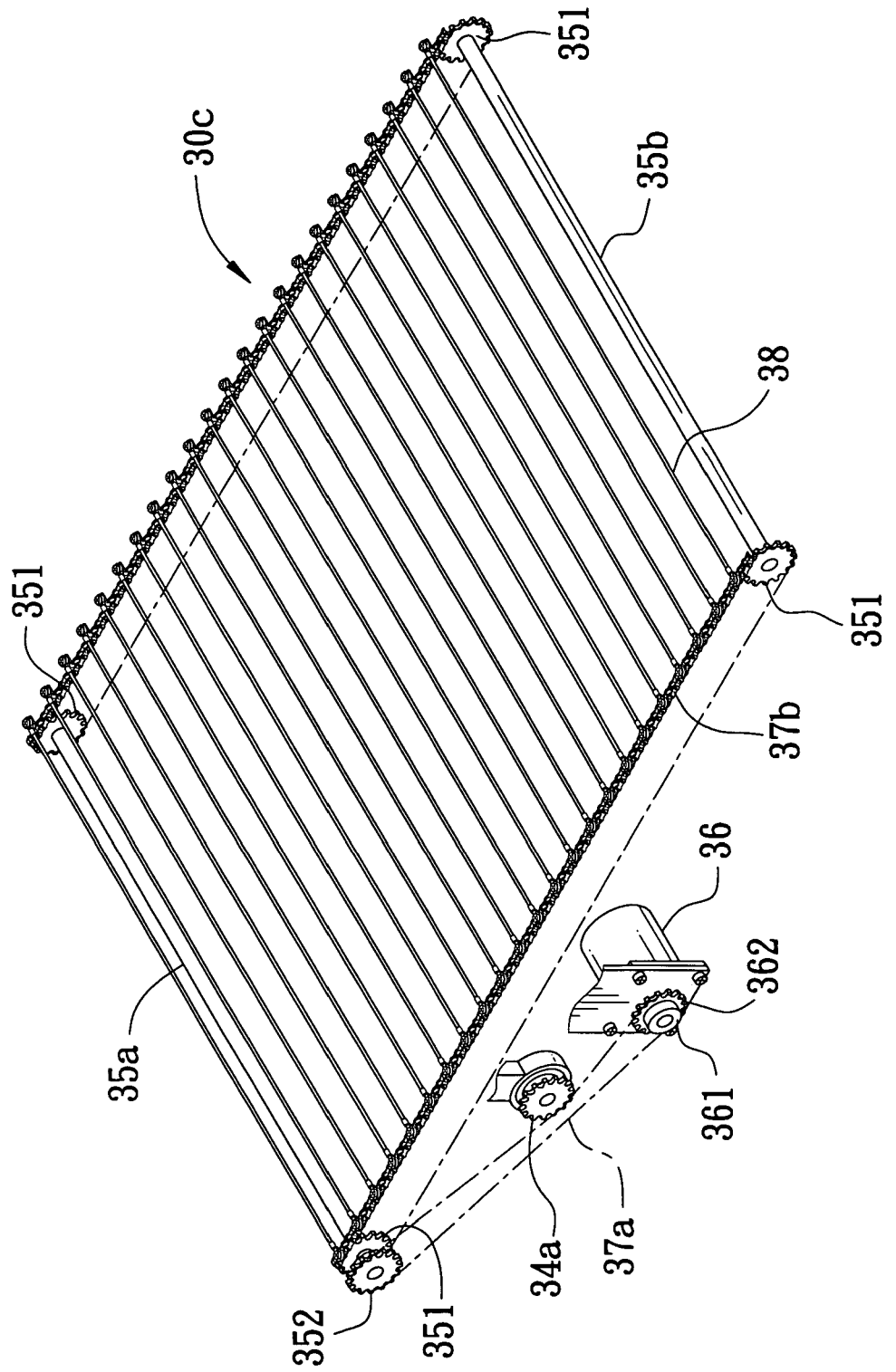
FIG. 6 is a partial perspective view of a second rolling base and a cloth filter in the preferred embodiment of an air filter for electric welding in the present invention; and, FIG. 7 is a front view of a sucking tube in the preferred embodiment of an air filter for electric welding in the present invention.

The rolling table 30c, as shown in FIG. 6, is composed of a frame 34 fixed inside the upper chamber 12 of the box 10 and located under the spark blocker 20, a first axle 35a connected pivotally to the left side of the frame 34 and provided with a driving gear 351 respectively at two ends and a driven gear 352 located outside one of the driving gears 351, a second axle 35b connected pivotally to the right side of the frame 34 and provided with a driving gear 351 respectively at two ends, a driving motor 36 fixed on the frame 34 and provided with a power-output shaft 361, a driving gear 362 fixed on the shaft 361, a first chain 37a mounted between the driving gear 362 of the driving motor 36 and the driven gear 352 of the first axle 35a, able to transfer the power of the driving motor 36 to the first axle 35a. The rolling table 30c further has two second chains 37b respectively mounted to engage the driving gear 351 of the first axle 35a and that of the second axle 35b at the same side and driven by the driving gear 351 of the first axle 35a to rotate, plural supporting rods 38 connected between the second chains 37b and spaced apart properly so as to be driven by the second chains 37b to move in a circulating condition, forming a rolling rods unit, a tension gear 34a connected pivotally with the frame 34 and matched properly with the first chain 37a so as to control the tension of the first chain 37a, and a timer 36a installed at a proper spot of the box 10 and connected with the driving motor 36 electrically so as to control an operating time of the driving motor 36, convenient for a user to adjust it.

The rolled cloth filter winder 30d is provided with a first shaft 39a bored with a shaft hole 391 at two ends respectively, which is tightly pushed respectively by the stoppers 321 and 331 of the bases 31 of the first rolling base 30b, rotating together with the stoppers 321 and 331. The rolled cloth filter winder 30d is further provided with a second shaft 39b bored with a shaft hole 391 at two ends respectively, which is tightly pushed respectively by the stoppers 321 and 331 of the bases 31 of the second rolling base 30b, rotating together with the stoppers 321 and 331, a cloth filter 39c rolled around the first shaft 39a and able to be pulled out from the free end to pass over the rolling table 30c for winding around the second shaft 39b, so that the cloth filter 39c can lie and move on the surface of the rolling rods unit formed by the supporting rods 38 of the rolling table 30c, moving along with the rolling table 30c to the second shaft 39b. The cloth filter 39c is always maintained in a certain tension after the second shaft 39b is rotated each time.

The blower 40 installed inside the lower chamber 13 of the box 10 is provided with a sucking opening 41 connected with the bottom end of the sucking tube 14 installed vertically through the dividing plate 11, two air exits 42 facing to two sidewalls respectively. Of course, the blower 40 can also be provided with a single air exit 42 preferably facing to the opening 171 of the rear wall 17.

Figure 7:
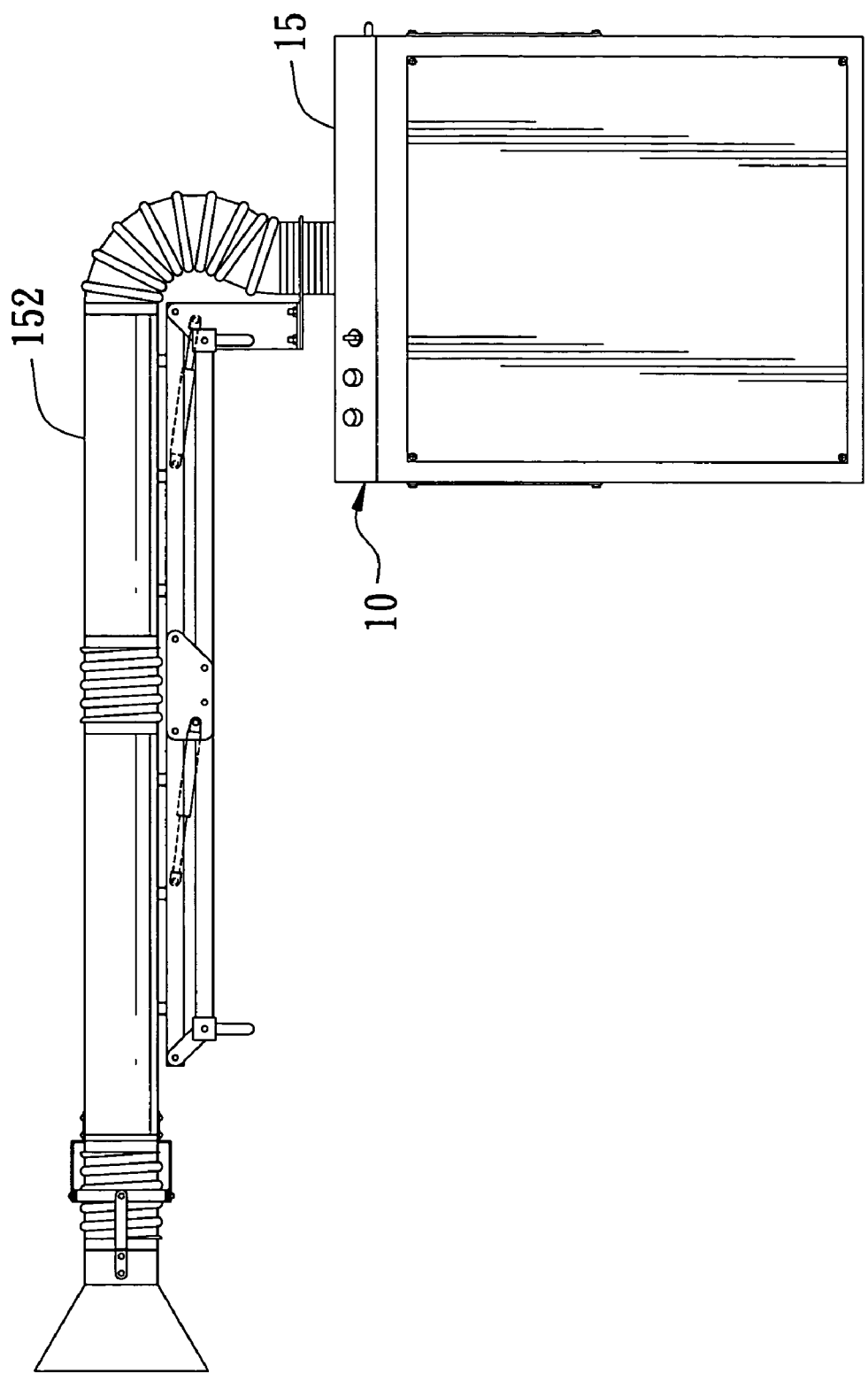

The extractable screening device 50 installed outside the opening 171 of the rear wall 17 is provided with a frame 51 that is connected integrally with the rear wall 17 of the box 10, provided with an interior space 511, an entry 512 formed at the front side of the interior space 511 and communicating with the opening 171 of the lower chamber 13, and an exit 513 formed at the rear side of the interior space 511 and communicating with the atmosphere, three plugging grooves 514 located at the upper portion of the frame 51 for inserting a three-layered filtrating screen 52 able to seal the space between the entry 512 and the exit 513. The three-layered filtrating screen 52 is provided with a primary screen 52a, a high-efficiency screen 52b and an active carbon screen 52c, located orderly from the inner plugging groove 514 In using, as shown in FIGS. 5 and 7, the sucking tube 152 of the box 10 is dragged at first to the spot to be sucked and then, the blower 40 is switched on so as to start sucking atmosphere from the entry of the sucking tube 152 into the upper chamber 12 of the box 10. The air in the upper chamber 12 is to flow through the air vents 221 of the upper receiving plate 22 of the spark blocker 20 and the air vents 211 of the lower receiving plate 21 orderly. Next, the air is sucked to pass through the cloth filter 39c under the spark blocker 20 as a primary filtration and then into the blower 40 through the tube 14, the interior of the lower chamber 13 from the air exits 42 and finally, flow through orderly the primary screen 52a, the high-efficiency screen 52b and the active carbon screen 52c of the three-layered filtrating screen 52 to the atmosphere via the opening 171 of the rear wall 17 of the box 10. The timer 36a of the rolling table 30c is used to control automatically the driving motor 36 to start operating for a preset period of time, so that the cloth filter 39c is to follow the rolling table 30 to displace a certain distance so as to renew partially or completely a length of the cloth filter 39c under the spark blocker 20, ensuring a good filtration. The cloth filter 39c used can be rolled around the second shaft 39b by means of the driving motor 36 of the second rolling base 30b that can properly drive the driven gear 322 to enable the second shaft 39b to rotate against the pivotal fixing member 32. The rotation of the cloth filter 39c is to stop automatically until reaching a certain rolling tension, enabling the cloth filter 39c to displace and roll smoothly.

The invention has the following advantages as can be seen from the foresaid description.

1. The spark blocker 20 installed above the upper chamber 12 can effectively block sparks from being sucked into the box 10, preventing from a fire or an air explosion from happening, and collect spark residue by the upper receiving plate 22 and the lower receiving plate 21, which are able to be extracted, convenient for dumping the residue.

2. Because a portion of the upper plate 22 facing exactly to the opening 151 of the top wall 15 is bored spaced apart thinly with the air vents 221, the air sucked in can pass through the upper plate 22 more evenly, not only blocking sparks better but also enabling air to flow fluently.

3. Because the cloth filter 39c is automatically rotated during operation, it can any time sustain a preferable condition for filtrating oil or impurities, able to prevent the filtrating screen 52 from being clogged and keep air flowing fluently to maintain a stable suction. That is, the filtrating screen 52 can last for a long time without often extracted out for cleaning.

4. The timer 36a can be set with a period of time for controlling the cloth filter 39c to rotate according to spark residue produced, maintaining a stable filtration for oil and impurities.

5. Because the filtrating screen 52 is extractable and provided with the primary screen 52a, the high-efficiency screen 52b and the active carbon screen 52c, achieving an excellent screening and deodorization and convenient for washing.

6. The side covers 181 set at the openings 18 can be opened for a user to change the rolled cloth filter 30d inside the upper chamber 12, and the front covers 191 set at the openings 19 can also be opened for a user to change the movable filter device 30 inside the upper chamber 12 and to maintain the blower 40 inside the lower chamber 13, easy and convenient to operate and maintain.

While the preferred embodiment of the invention has been described above, it will be recognized and understood that various modifications may be made therein and the appended claims are intended to cover all such modifications that may fall within the spirit and scope of the invention.

What is claimed is:

1. An air filter for electric welding comprising:
   a box provided with a dividing plate to divide said box into an upper chamber and a lower chamber, an opening at its top wall for connecting with a sucking tube, a sidewall provided with a plugging groove at the top, and a rear wall of said lower chamber provided with an opening; said dividing plate provided with a penetrating hole at the center to communicate with said upper chamber and said lower chamber;
   a spark blocker fitted in said plugging groove of said box to seal the top side of said upper chamber;
   a movable filter device being installed inside said upper chamber and comprising of a first rolling base, a second rolling base corresponding with said first rolling base, a rolling table and a rolled cloth filter winder;
   said rolling table comprising of:
      a frame fixed under said spark blocker inside said upper chamber;
      a first axle fixed at one side of said frame and provided with a driving gear respectively at two ends and a driven gear set outside one end of said driving gear;
      a second axle fixed at the other side of said frame and provided with a driving gear respectively at two ends,
      a driving motor fixed on said frame and provided with a power-output shaft installed with a driving gear;
      a first chain mounted between said driving gear of said driving motor and said driven gear of said first axle and able to transfer power to said first axle;
      two second chains respectively mounted between said driving gear of said first axle and that of said second axle at the same side and driven by said driving gears of said first axle to rotate; and
      plural supporting rods connected between said second chains and spaced apart with a preset distance and driven by said second chains to move in a circulating condition, forming a rolling rods unit;
   said first rolling base and said second rolling base respectively installed on two sides of an upper surface of said dividing plate, said rolling table fixed under said spark blocker inside said upper chamber and having a circulating rods unit, said rolled cloth filter winder provided with a first shaft connected pivotally with said first rolling base, a second shaft connected pivotally with said second rolling base, a rolled cloth filter mounted around said first shaft and provided with a free end able to be pulled outwards to pass over said rolling table to get wound around said second shaft, said cloth filter also laid and moved on said rolling table;
   a blower installed inside said lower chamber of said box and provided with a sucking opening connected with said penetrating hole of said dividing plate, and at least an air exit; and
   an extractable screening device installed outside said opening of said rear wall of said box and provided with a frame having an interior space, an entry and an exit, a filtrating screen set above said frame and having at least a screen located between said entry and said exit for screening air sucked in, said entry communicating with said exit and said opening of said lower chamber.

2. An air filter for electric welding as claimed in claim 1, wherein said penetrating hole of said dividing plate is connected with a tube, which has two ends extending respectively into said upper chamber and said lower chamber and connected with said sucking opening of said blower by the bottom end.

3. An air filter for electric welding as claimed in claim 1, wherein said upper chamber of said box is provided with an opening at two sidewalls respectively, covered pivotally by a movable side cover.

4. An air filter for electric welding as claimed in claim 1, wherein said upper chamber of said box and said lower chamber are respectively provided with an opening at the front side, covered pivotally by a movable front cover.

5. An air filter for electric welding as claimed in claim 1, wherein said spark blocker is provided with a lower receiving plate and an upper receiving plate located above said lower receiving plate, said lower receiving plate and said upper receiving plate spaced apart properly and provided respectively with plural air vents of a preset size.

6. An air filter for electric welding as claimed in claim 5, wherein said air vents bored in a portion of said upper receiving plate facing exactly to said opening of said top wall of said box are spaced apart thinly.

7. An air filter for electric welding as claimed in claim 1, wherein said first rolling base is provided with:
   two bases fixed respectively at a front and a rear portion of a left upper surface of said dividing plate and provided respectively with a bearing base at the top, and two bearing installed in said bearing base;
   an immovable pivot connected pivotally with said bearings of one of said bases and provided with an immovable stopper at an inner end for pushing tightly against one end hole of said first shaft; and,
   a movable pivot connected pivotally with said bearings of the other of said bases and provided with a stopper movable inwards for pushing elastically against the other end hole of said first shaft.

8. An air filter for electric welding as claimed in claim 1, wherein said second rolling base is provided with:
   two bases fixed respectively at a front and a rear portion of a right upper surface of said dividing plate and provided respectively with a bearing base at the top, and two bearings installed in said bearing base;
   an immovable pivot connected pivotally with said bearings of one of said bases and provided with a stopper immovable for pushing tightly against one end hole of said second shaft;
   a movable pivot connected pivotally with said bearings of the other of said bases and provided with a stopper movable inwards for pushing elastically against the other end hole of said second shaft; and, a driving motor able to drive said movable pivot to rotate so as to let said cloth filter wound around said second shaft in a preset tension.

9. An air filter for electric welding as claimed in claim 1, wherein said rolling table is also provided with a tension gear that is connected pivotally to said frame, engaged with a portion of said first chain to control the tension of said first chain.

10. An air filter for electric welding as claimed in claim 1, wherein said rolling table is further provided with a timer for controlling a period of time for said driving motor to operate.

11. An air filter for electric welding as claimed in claim 1, wherein said blower is provided with a sucking opening facing to the rear wall of said box.

12. An air filter for electric welding as claimed in claim 1, wherein said blower is provided with two air exits facing to two sidewalls respectively.

13. An air filter for electric welding as claimed in claim 1, wherein said extractable screening device is provided with three filtrating screens.

14. An air filter for electric welding as claimed in claim 13, wherein said three filtrating screens are a primary screen, a high-efficiency screen and an active carbon screen.

15. An air filter for electric welding as claimed in claim 1, wherein said sucking tube can be bent randomly to any direction.

* * * * *